United States Patent

Nagao et al.

[11] 3,892,354
[45] July 1, 1975

[54] FILM COUNTER ASSEMBLY

[75] Inventors: Takumi Nagao; Manabu Sugano, both of Tokyo, Japan

[73] Assignee: Kabushiki Kaisha Yashica, Tokyo, Japan

[22] Filed: Dec. 21, 1973

[21] Appl. No.: 427,214

[30] Foreign Application Priority Data
Dec. 28, 1972  Japan.................... 47-2977

[52] U.S. Cl................ 235/91 C; 235/103; 354/215; 354/217
[51] Int. Cl. ................................... G06m 1/32
[58] Field of Search............. 235/64.7, 91 C, 103; 354/215, 217, 289

[56] References Cited
UNITED STATES PATENTS

| | | | |
|---|---|---|---|
| 540,604 | 6/1895 | Weiss................... | 235/103 |
| 557,446 | 3/1896 | Starrett................. | 235/103 |
| 1,172,793 | 2/1916 | Hapgood............... | 235/103 |
| 2,019,286 | 10/1935 | Arber................... | 235/103 |
| 2,358,327 | 9/1944 | Harris................... | 235/91 C |
| 2,469,008 | 5/1949 | Simmon et al........ | 354/217 |

FOREIGN PATENTS OR APPLICATIONS

| | | | |
|---|---|---|---|
| 237,474 | 2/1962 | Australia.............. | 235/91 C |
| 236,216 | 10/1964 | Austria................. | 354/215 |

Primary Examiner—Richard B. Wilkinson
Assistant Examiner—Stanley J. Witkowski
Attorney, Agent, or Firm—Marn & Jangarathis

[57] ABSTRACT

There is disclosed an assembly for assuring zero return of a gradation disc comprising a drive transmission assembly including worm and worm gear means for a counter gradation disc in which the gradation disc driving gear is provided with a cutaway portion such that the gradation disc idles after being driven to a predetermined gradation, with the driving gear being returned to zero return by a moveable stop member spring biased to restore a predetermined position against the rotating potential of the driving gear bias to zero position.

3 Claims, 4 Drawing Figures

3,892,354

FILM COUNTER ASSEMBLY

This invention relates to an assembly for a camera, and more particularly, relates to an assembly for the zero return of a film counter driven by a worm and worm gear in a photographic camera, such as a 35 mm. camera requiring film rewinding.

BACKGROUND OF THE INVENTION

It has heretofore been proposed to use a worm and worm gear assembly for a film counter for a camera. However, such mechanism has not found practicality in a 35 mm. camera in which the film is rewound into the magazine after a predetermined number of film frames have been exposed, since the film may be easily rewound beyond the zero point of the counter.

OBJECT OF THE INVENTION

An object of the present invention is to provide a novel film counter assembly for a camera utilizing a worm and worm gear assembly to provide for zero return upon rewinding of the film.

BRIEF DESCRIPTION OF THE DRAWINGS

A better understanding of the present invention, as well as additional objects and advantages thereof will become apparent upon consideration of the detailed disclosure thereof, especially when taken with the accompanying drawings wherein like numerals designate like parts throughout.

DETAILED DESCRIPTION OF THE INVENTION

Figure 1:
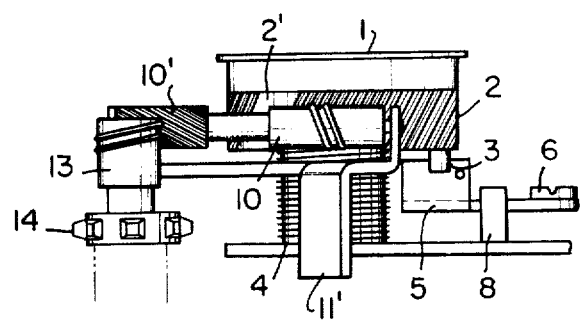
FIG. 1 is a partial elevational view of the film counter assembly of the present invention.

Referring now to FIG. 1, there is illustrated a film counter or gradation disc 1 which is affixed to a worm gear 2 adapted to be rotatable in coaxial arrangement therewith and provided with a return spring 4. The worm gear 2 is caused to engage a worm 10 which cooperates with a sprocket 14 for film wind-up through an intermediate transmission member 13 directly connected to the sprocket 14. In such a transmission system, the worm gear 2 and the worm 10 engaged therewith are provided with teeth of a particular configuration such that the reversable rotation is possible. The worm 10 is rotatably mounted on a support member 11 which, in turn, is pivotably mounted on an axis 12. The support member 11 is biased by a spring 18 to engage the worm 10 against the worm gear 2 with an end 11' thereof engaged by an end 15' of a moveable member 15. Another portion 15' (FIG. 2) of the moveable member 15 is biased by a spring 16 against a rear cover 17 of the camera. A stop pin 3 is mounted on the worm gear 2 and is placed in contact with a moveable stop member 5 under the action of the spring 4 exerted on the worm gear 2. The stop member 5 pivotally mounted on an axis 6, in turn, is urged by a spring 7 into contact with a stop member 8 mounted on a stationary portion of the camera body.

Figure 2:
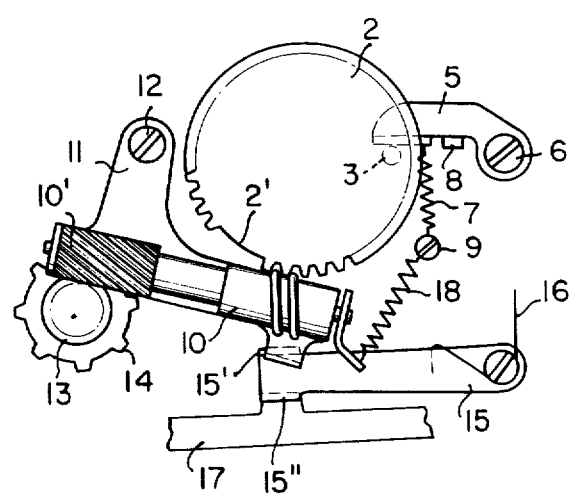
FIG. 2 is a top view of the film counter assembly of FIG. 1.

Referring to FIG. 2, there is illustrated the film counter mechanism in a starting mode. Upon introduction of the film into the camera, the rear cover 17 of the camera is closed so as to bring the moveable member 15 into a fixed position, with the worm 10 being caused to engage the worm gear 2 by the tension of the spring 18. At such time, the stop pin 3 disposed on the worm gear 2 is urged to a zero return by the moveable member 5 under the tensioning of the spring 4. The tensioning force of the spring 7 is greater than that of the spring 4 so that the moveable stop member 5 is held in a fixed position corresponding to the position at which the moveable stop member 5 is maintained against the stop member 8.

As the film is transported within the camera body, the sprocket 14 is caused to rotate in a direction of film travel with the movement thereof being transmitted by an intermediate member 13 and the worms 10 and 10' to the worm gear 2 which causes the gradation disc 1 to be displaced by an incremental amount corresponding to one frame relative to one frame of film transport at the predetermined reduction gear ratio thereof.

Figure 3:
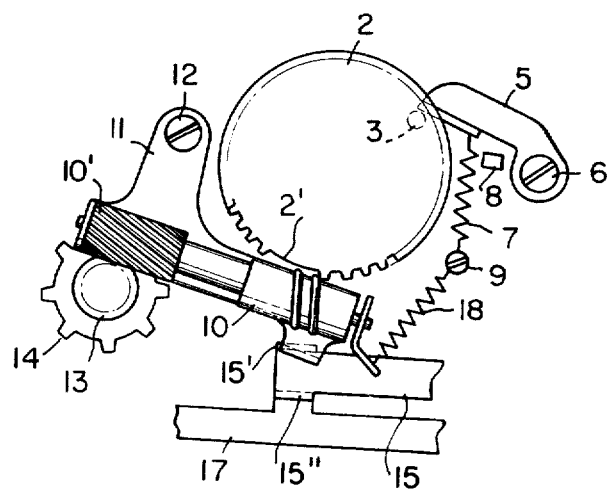
FIG. 3 is a top view of the film counter assembly when rewound to beyond zero return.

With a 35 mm. camera, it is necessary to rewind the film after completion of exposure thereof. Upon rewinding of the film, the sprocket 14 is caused to rotate in a reversed direction and accordingly reverses the rotation of the gear 2 through the worms 10 and 10'. Upon completion of film rewinding, the gradation disc 1 is returned to the initial operation as indicated in FIG. 2. However, should the rewinding continue beyond such point, the stop pin 3 is caused to be moved against the member 5 biased by the spring 7. Such counter-revolution of the counter continues until the tensioning of the spring 7 is sufficient to cause the worm gear 2 to idle on the worm 10 as the result of the cutaway way portion 2' formed on the worm gear whereby further rotation of the worm gear 2 ceases as illustrated in FIG. 3.

Figure 4:
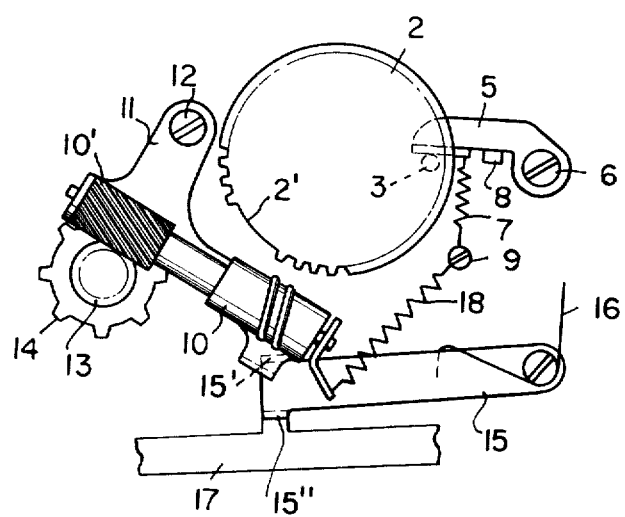
FIG. 4 is the film counter assembly of the present invention upon opening of the film containing compartment.

FIG. 4 illustrates the counter assembly when the rear cover 17 of the camera is open for the purpose of removing exposed film and for the insertion of unexposed film into the film retaining compartment. As illustrated, the lever 15 is caused to move counter-clockwise by the tensioning force of the spring 16 which is greater than the tensioning force of the spring 18 to cause disengagement of the worm 10 from the gear 2. Upon closing of the rear cover 17 of the camera, the lever 15 is caused to rotate in a clockwise direction, thereby causing the worm 10 to re-engage the gear 2.

As appreciated from the aforementioned description, the assembly of the present invention employs a drive transmission system including a worm and worm gear assembly for the transmission of rotation by the film sprocket to the worm gear for driving a film counter. Operation of the film rewinding assembly is accompanied with reverse rotation of the film counter so that the actual state of film rewinding may be visually ascertained with a warning being provided with respect to a state of rewind beyond that of zero return. While the invention has been described in connection with an embodiment thereof, it will be understood that many modifications or variations will become apparent to those of ordinary skill in the art; and that this application is intended to cover any adaptations or variations thereof.

What is claimed is:

1. A film counter assembly for a camera which comprises:

a gradation counter disc mounted on a worm gear, said worm gear having a cutaway portion thereof;

a worm means for rotatably engaging said worm gear; and a stop means for idling said worm means at said cutaway portion of said worm gear means to prevent further rotation thereof during rewinding operation of film in said camera.

2. The improved film counter assembly as defined in claim 1 wherein said stop means includes a pin mounted on said worm gear which engages a spring biased lever arm.

3. The film counter assembly as defined in claim 2 wherein said worm means is rotatably mounted on a spring biased support member and wherein a spring biased lever member is rotatably mounted to said camera and in contact with a cover of said camera whereby opening of said cover causes said lever member to contact the support member to thereby move said worm means out of engagement with said worm gear.

* * * * *